Sept. 10, 1963 P. GREUET 3,103,638

HIGH-FREQUENCY ENERGY BRANCHING CIRCUIT

Filed Jan. 3, 1962

INVENTOR
*PIERRE GREUET*

BY
[signature]
AGENT

United States Patent Office 3,103,638

Patented Sept. 10, 1963

3,103,638
HIGH-FREQUENCY ENERGY BRANCHING CIRCUIT

Pierre Greuet, Montfermeil, France, assignor to North American Philips Company, Inc., New York, N.Y., a corporation of Delaware Filed Jan. 3, 1962, Ser. No. 164,015
Claims priority, application France Jan. 17, 1961
3 Claims. (Cl. 333—9)

The invention relates to a high-frequency energy distributor, in particular to such a distributor intended for feeding a number of television receivers from a single television antenna.

The design of such distributors always is delicate if it is desired that all the receivers should be equally fed in any television band, that is to say that the operation of the distributor has to be substantially independent of the operating frequency in a certain frequency band under consideration. In addition, for the end in view, that is to say for simultaneous feeding of a number of television receivers by a single antenna, the inclusion of the distributor should not give rise to any disturbance compared with the case of the antenna directly feeding one of the receivers; this means that the distributor has to be designed so as to operate normally with a predetermined input impedance which also has to be the same as that of each receiver.

It is the object of the present invention to provide distributors satisfying in an optimum manner the various practical requirements, in particular distributors of the kind described hereinbefore.

The invention consists substantially in that the distributor comprises groups of coaxial cables each of which feeds an associated separate output and has its outer conductor connected to earth near the output end, the input of the inner conductor of each cable being connected to the input of the outer conductor of the next cable of the same group, with the exception of the input of the inner conductor of the final cable, which is connected to the feeding terminal common to the various groups, and of the outer conductor of the first cable, which is connected to earth, all the coaxial cables, with the exception of the first cable of each group, being provided with a outer sheath of finely divided ferromagnetic material.

In order that the invention may readily be carried into effect, it will now described, by way of example, with reference to the accompanying diagrammatic drawings, in which:

FIG. 1 shows the assembly of a distributor comprising six outputs S1, S′1, S2, S′2, S3, S′3 each connected, or capable of being connected, to a television receiver, and an input E fed by the common aerial.

Figure 1:
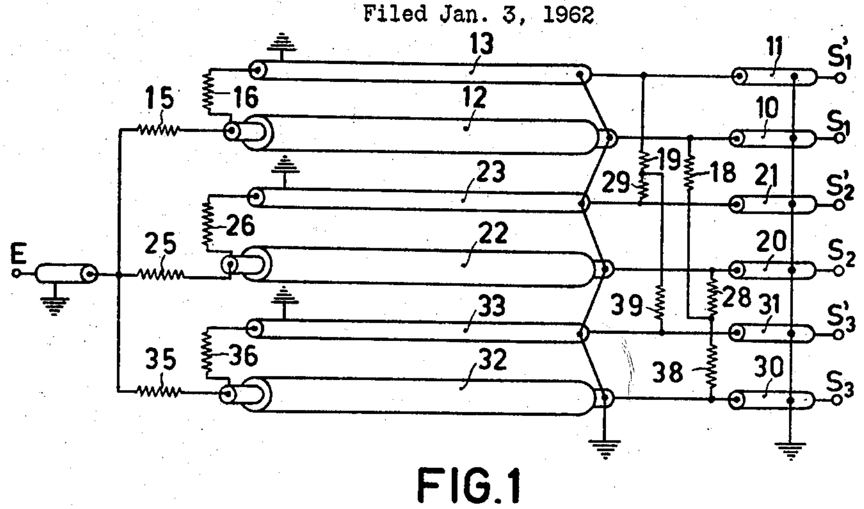
FIG. 1 shows a distributor in accordance with the invention having six outputs and hence capable of feeding six television receivers from a common antenna.

According to the invention, the outputs (and the corresponding feeders 10—11, 20—21, 30—31 of the television receivers) are arranged in pairs S1—S′1, S2—S′2, S3—S′3, a separate pair of feeding cables corresponding to each of these pairs; cables 13, 23, 33 are of the usual coaxial type comprising an outer conductor enclosing an inner conductor, and they feed the outputs S′1, S′2, S′3 respectively, whilst cables 12, 22, 32 comprise in addition to this structure an outer sheath of finely divided ferromagnetic material, for example of ferroxcube, and feed the outputs S1, S2, S3. It should be noted that an arrangement such as 12 is known in antenna feeder symmetrizing devices. Further the outer conductors of the cables 13, 23, 33 are connected to earth at the input of each cable and the outer conductors of all the cables are connected to earth at their outputs. The cable 12 is connected in series to the cable 13 through a resistor 16; similarly the cable 22 is connected to the cable 23 through a resistor 26 and the cable 32 is connected to the cable 33 through a resistor 36, the inner conductors of the cables 12, 22, 32 being fed in star connection from an input E through resistors 15, 25, 35 respectively. The values of similar elements in the resulting pairs are at least substantially equal and correct matching of the input of the distributor is obtained, if $$Z=\frac{2(Z+R)}{N}$$

where:

$Z$=input and output impedance,
$R$=common value of the resistors 15, 25, 35 and 16, 26, 36,
$N$=number of the star-connected pairs (here =3).

Resistors 18, 28, 38 and 19, 29, 39 are also star-connected to the output to compensate for any loading inequalities at the outputs. Their value R′ is determined experimentally.

In a practical embodiment, where $Z$=50 ohms, $R$=37.5 ohms and $R'$=75 ohms, each sheath of ferromagnetic material being constituted by three identical rings arranged side by side and having a length of 20 mms. each.

With these values the attenuation at each output is $10db\pm2$ within a frequency band extending from 40 mc./s. to 820 mc./s. and corresponding to television bands I to V. Screening between two outputs (interference of one output with the other) is comprised between 15 and 20 db; the reflection factor at the input is less than 0.2.

It should be noted that the output currents at the output terminals S1, S′1 . . . S′3 are substantially in phase in such a distributor.

Figure 2:
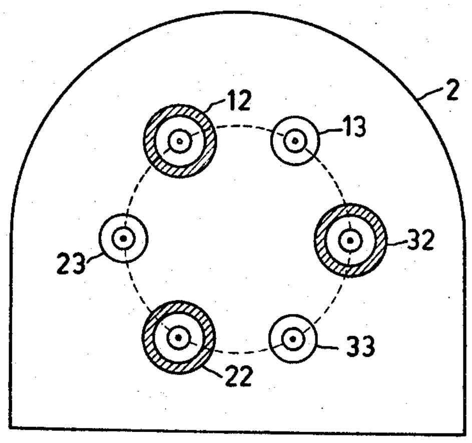
FIG. 2 shows a possible structural arrangement of this distributor.

FIGURE 2 shows the structural disposition of the coaxial cables arranged on a circle under a cap 2.

Figure 3:
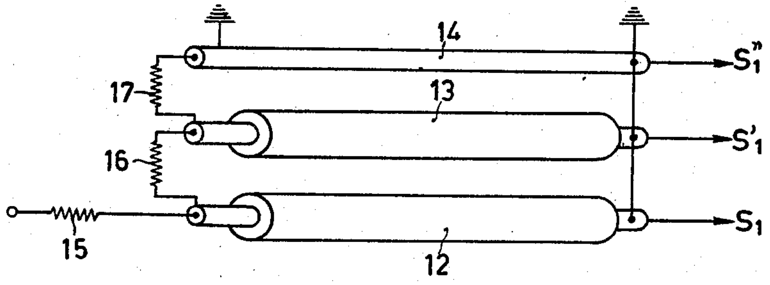
FIG. 3 shows an example of a group of three cables.

FIGURE 3 shows the design of a distributor in accordance with the invention in which a pair of cables corresponding, for example, to the outputs S1 and S′1 is replaced by a group of three cables 12, 13, 14 corresponding to three separate outputs S1, S′1 and S″1 fed by them respectively. These cables are connected in series at the input ends, that is to say, the input of the outer conductor of the cable 12 is connected to the input of the inner conductor of the cable 13 through a resistor 16, and the outer conductor of the cable 13 is similarly connected to the inner conductor of the cable 14 through a resistor 17. The outer conductor of the cable 14 is connected to earth at its input and the cables 12 and 13 are provided with magnetic sheaths.

If there are three such identical groups, a distributor with nine outputs is obtained. More generally, starting from this arrangement a distributor with $N=AB$ outputs may be obtained, where A is the number of groups and B the number of cables in each group. Correct matching of the input of the distributor here is obtained if:

$$Z=\frac{(Z+R).B}{A}$$

What is claimed is:

1. A distributor for high-frequency energy, in particular for feeding a number of television receivers from a single television antenna characterized in that the distributor comprises groups of coaxial cables each of which feeds an associated separate output and has its outer conductor connected to earth near the output end, the input end of the inner conductor of each cable being connected to the input end of the outer conductor of the next cable of each group, with the exception of the input end of the inner conductor of the final cable of each group, which is connected to the feeding terminal common to the various groups, and of the input end of the outer conductor of the first cable of each group, which is connected to earth, all the coaxial cables, with the exception of the first cable of each group, being provided with an outer sheath of finely divided ferromagnetic material.

2. A distributor as claimed in claim 1, characterized in that a resistor is connected between the input end of the inner conductor of one cable and the input end of the outer conductor of the next cable of a group.

3. A distributor as claimed in claim 1, characterized in that balancing resistors are connected between the inner conductors of the corresponding cables of each group at the outputs of these cables.

References Cited in the file of this patent

"Shared Television Aerials," Wireless World, August 1949, pages 287–288.